United States Patent [19]

Tappenden

[11] Patent Number: 5,645,203
[45] Date of Patent: Jul. 8, 1997

[54] BUSINESS CARD DISPENSING HOLDER

[76] Inventor: Philip Tappenden, 1312 Naamans Creek Rd., Boothwyn, Pa. 19061

[21] Appl. No.: 450,667

[22] Filed: May 30, 1995

[51] Int. Cl.⁶ .................................................. B60R 11/00

[52] U.S. Cl. .................. 224/482; 40/124; 211/88.01; 224/277; 224/557

[58] Field of Search ......................... 224/482, 277, 224/556, 557, 560; 40/591, 124, 124.2; 211/45, 50, 72, 80; D3/249, 274, 293, 294; 206/555

[56] References Cited

U.S. PATENT DOCUMENTS

| 3,958,350 | 5/1976 | Garson | 40/591 |
| 4,889,268 | 12/1989 | Shubeck | 224/277 |
| 5,513,746 | 5/1996 | Anderson | 206/555 X |

FOREIGN PATENT DOCUMENTS

| 3615839 | 1/1987 | Japan | 224/482 |
| 40 5139215 | 6/1993 | Japan | 224/277 |

*Primary Examiner*—Renee S. Luebke

[57] ABSTRACT

A holder for supporting a plurality of business cards relative to a vehicle. The inventive device includes a base plate having a mounting assembly for coupling to a vehicle. A dispensing assembly projects from the base plate and supports a plurality of stacked business cards for individual reception by a person.

4 Claims, 3 Drawing Sheets

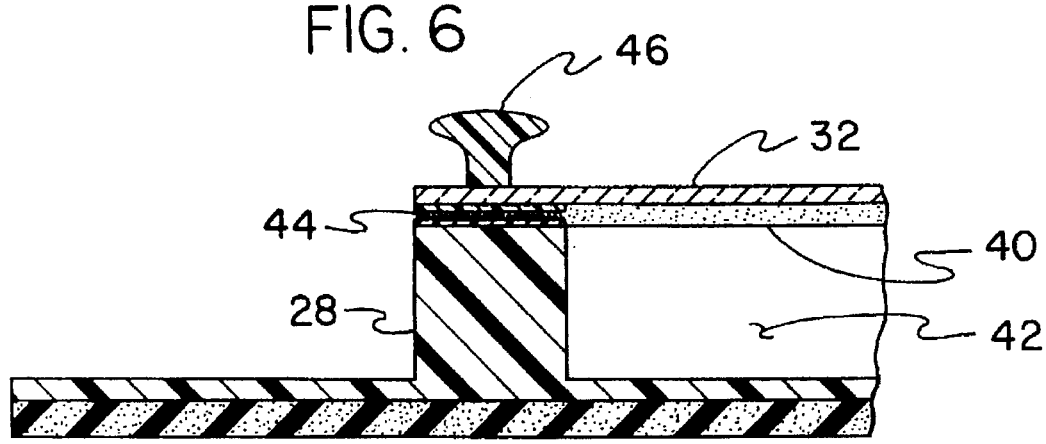
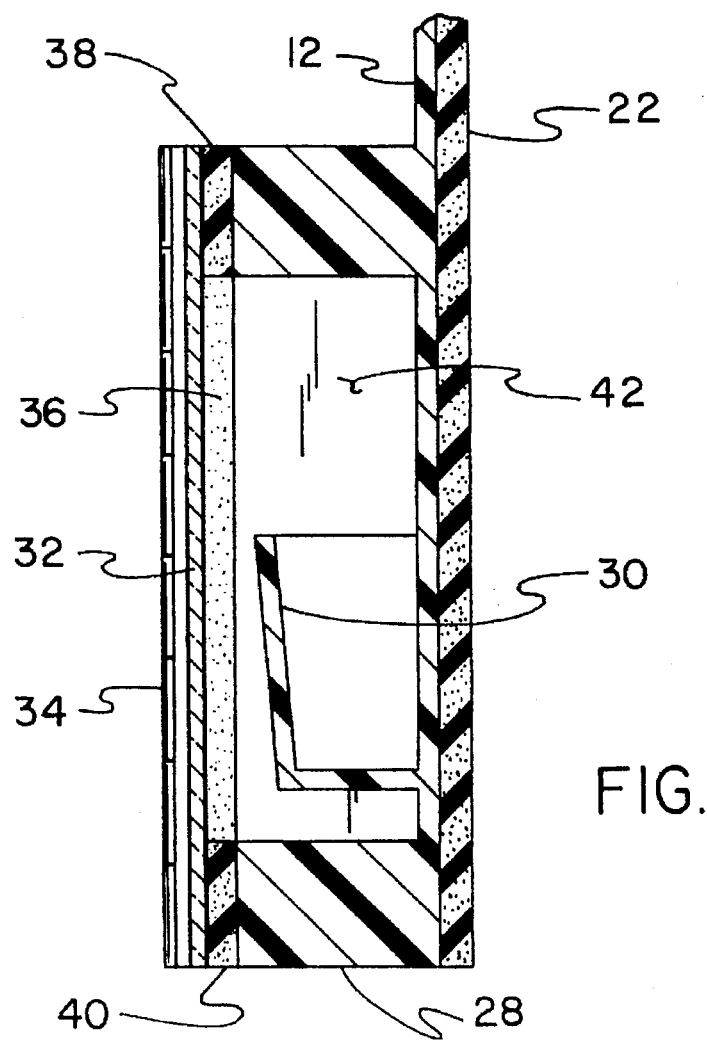

BUSINESS CARD DISPENSING HOLDER

BACKGROUND OF THE INVENTION

1. Field of the Invention

The present invention relates to article dispensing structures and more particularly pertains to a business card dispensing holder for supporting a plurality of business cards relative to a vehicle.

2. Description of the Prior Art

The use of article dispensing structures is known in the prior art. More specifically, article dispensing structures heretofore devised and utilized are known to consist basically of familiar, expected and obvious structural configurations, notwithstanding the myriad of designs encompassed by the crowded prior art which have been developed for the fulfillment of countless objectives and requirements.

Known prior art article dispensing structures include U.S. Pat. Nos. 4,887,739; 5,275,285; U.S. Pat. Nos. Des. 324,883; 328,542; 343,638; and 299,288.

While these devices fulfill their respective, particular objectives and requirements, the aforementioned patents do not disclose a business card dispensing holder for supporting a plurality of business cards relative to a vehicle which includes a base plate having a mounting assembly for coupling to a vehicle, and a dispensing assembly projecting from the base plate and supporting a plurality of stacked business cards for individual reception by a person.

In these respects, the business card dispensing holder according to the present invention substantially departs from the conventional concepts and designs of the prior art, and in so doing provides an apparatus primarily developed for the purpose of supporting a plurality of business cards relative to a vehicle.

SUMMARY OF THE INVENTION

In view of the disadvantages inherent in the known types of article dispensing structures now present in the prior art, the present invention provides a new business card dispensing holder construction wherein the same can be utilized for supporting a plurality of business cards relative to a vehicle for reception by a person.

To attain this, the present invention generally comprises a holder for supporting a plurality of business cards relative to a vehicle. The inventive device includes a base plate having a mounting assembly for coupling to a vehicle. A dispensing assembly projects from the base plate and supports a plurality of stacked business cards for individual reception by a person.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is another object of the present invention to provide a new business card dispensing holder which may be easily and efficiently manufactured and marketed.

It is a further object of the present invention to provide a new business card dispensing holder which is of a durable and reliable construction.

An even further object of the present invention is to provide a new business card dispensing holder which is susceptible of a low cost of manufacture with regard to both materials and labor, and which accordingly is then susceptible of low prices of sale to the consuming public, thereby making such business card dispensing holders economically available to the buying public.

Still another object of the present invention is to provide a new business card dispensing holder for supporting a plurality of business cards relative to a vehicle.

Yet another object of the present invention is to provide a new business card dispensing holder which includes a base plate having a mounting assembly for coupling to a vehicle, and a dispensing assembly projecting from the base plate and supporting a plurality of stacked business cards for individual reception by a person.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 6 is a cross-sectional view taken along line 6—6 of FIG. 3.

FIG. 7 is a cross-sectional view taken along line 7—7 of FIG. 3.

DESCRIPTION OF THE PREFERRED EMBODIMENT

Figure 1:
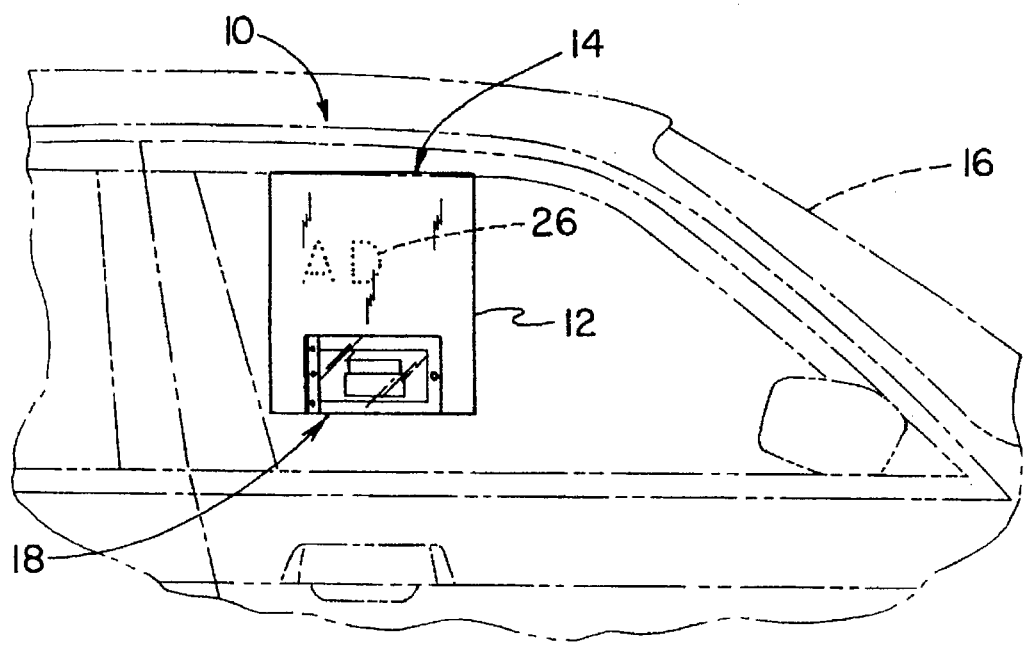
FIG. 1 is an elevation view of a business card dispensing holder according to the present invention in use.

With reference now to the drawings, and in particular to FIGS. 1–7 thereof, a new business card dispensing holder embodying the principles and concepts of the present invention and generally designated by the reference numeral 10 will be described.

Figure 2:
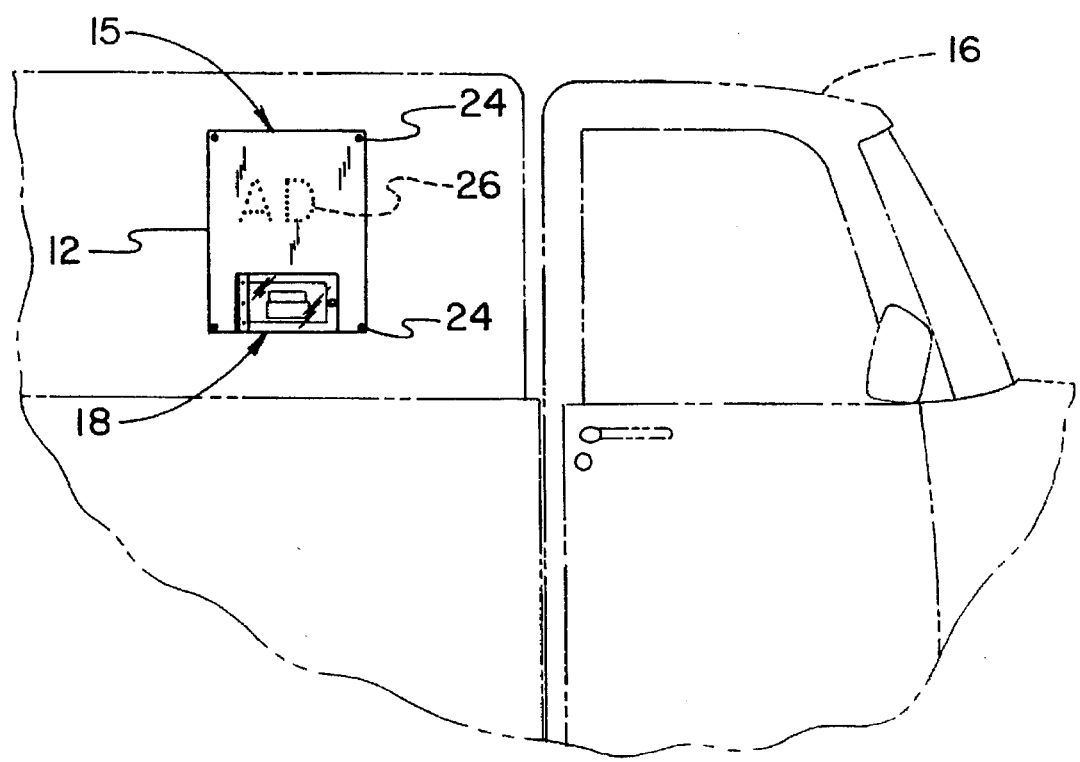
FIG. 2 is an elevation view of the present invention in an alternative use.

More specifically, it will be noted that the business card dispensing holder 10 comprises a substantially rectangular base plate 12 and a mounting means 14 for securing the base plate 12 relative to a vehicle 16 as shown in FIGS. 1 and 2 of the drawings. A dispensing means 18 is secured to a front of the base plate 12 for supporting and permitting selective manual dispensing of business cards therefrom. By this structure, an individual may obtain a business card from an unattended vehicle as desired.

Figures 3, 4:
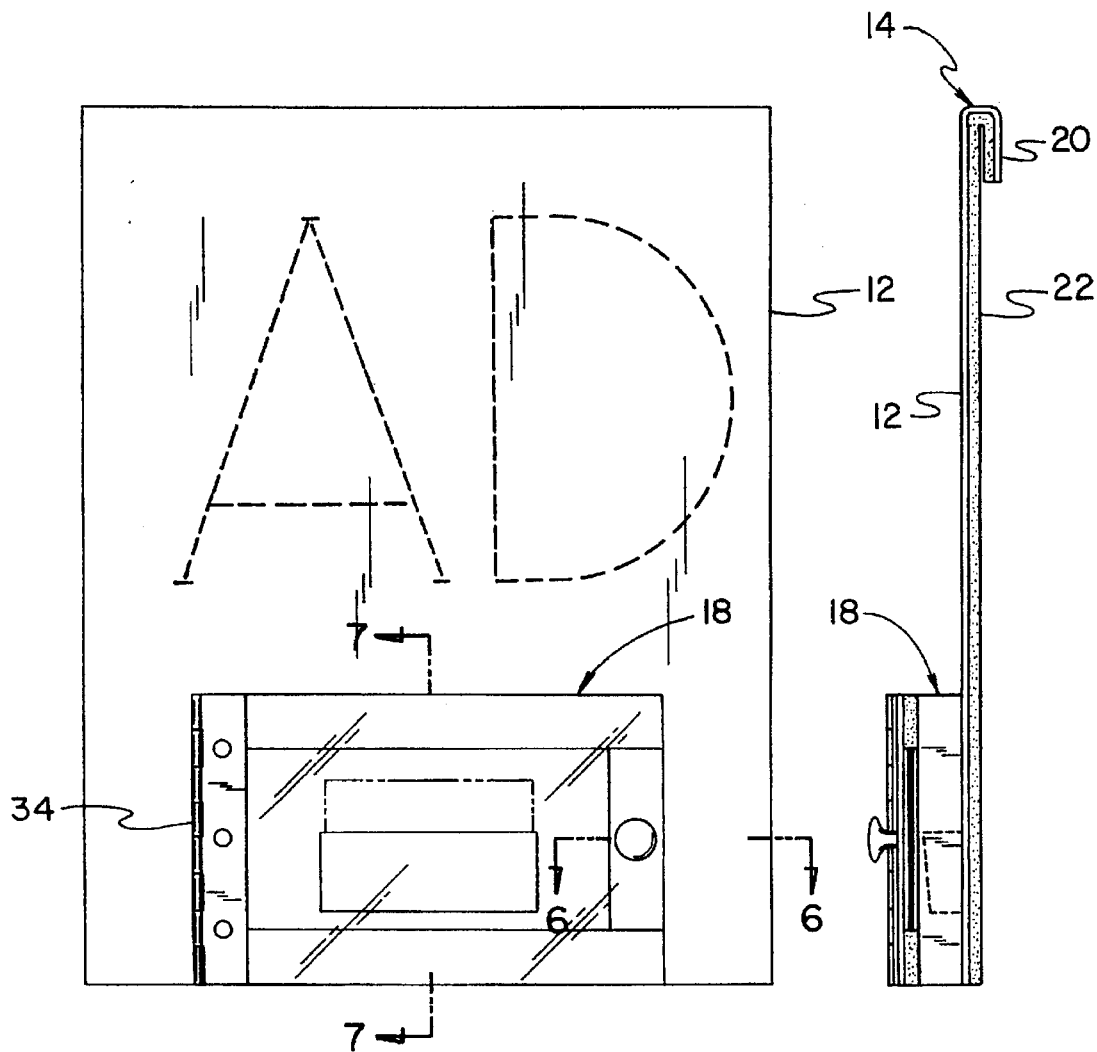
FIG. 3 is a front elevation view of the present invention, per se.
FIG. 4 is a side elevation view thereof.
Figure 5:
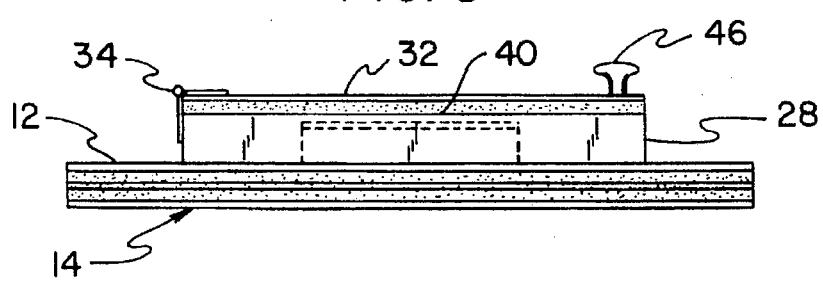
FIG. 5 is a bottom plan view of the present invention.

As best illustrated in FIGS. 3 through 5, it can be shown that the mounting means 14 of the present invention 10 preferably comprises a depending lip 20 formed along an upper edge of the base plate 12. The depending lip 20 is shaped so as to project into a substantially spaced and parallel orientation relative to an interior surface of the base plate 12 such that a window of the vehicle 16 can be positioned therebetween as shown in FIG. 1 of the drawings. Preferably, a protective backing 22 is coextensively positioned along the interior surface of the base plate 12 and extends along an interior surface of the depending lip 20 as well, as best illustrated in FIGS. 4 and 5 of the drawings. By this structure, the base plate 12 can be suspended from an upper edge of a window of a vehicle 16 as shown in FIG. 1 of the drawings.

Alternatively, and as shown in FIG. 2 of the drawings, the mounting means 15 may simply comprise a plurality of fasteners 24 which are directed through unlabelled apertures in the base plate 12. The fasteners 24 are operable to be engaged to a portion of a vehicle 16, such as the truck illustrated in FIG. 2, and may comprise threaded fasteners such as screws or bolts, or alternatively may comprise rivets.

As shown in FIGS. 1 and 2, the base plate 12 is preferably large enough such that indicia 26 can be printed thereon in the form of an advertisement or the like. The dispensing means 18 is thus preferably mounted proximal to a lower edge of the base plate 12 such that the indicia or advertisement 26 is readily viewable along a central upper portion of the base plate 12.

Referring now to FIGS. 5 through 7 wherein the dispensing means 18 of the present invention 10 is illustrated in detail, it can be shown that the dispensing means 18 comprises a substantially rectangular perimeter frame 28 secured to a front face of the base plate 12. A pocket member 30, as shown in FIG. 7, is mounted to the base plate 12 and positioned within the perimeter frame 28. A door 32, preferably constructed of a substantially transparent material, is pivotally mounted to a vertical lateral edge of the perimeter frame 28 by a hinge 34 extending therebetween. A vertical sealing strip 36 extends along a portion of the perimeter frame 28 proximal to the hinge 34 and cooperates with upper and lower horizontal sealing strips 38 and 40 extending along upper and lower horizontal portions of the perimeter frame 28 to enclose a hollow interior 42 of the dispensing means 18 within which the pocket member 30 resides. To maintain the door 32 in a normally closed configuration, cooperative sections of hook and loop material 44 are interposed between a lateral edge of the door and a lateral portion of the perimeter frame 28. A knob 46 is secured to the door and projects exteriorly thereof to facilitate manual manipulation or pivoting of the door during placement or retrieval of business cards from the pocket member 30. By this structure, a plurality of stacked business cards can be positioned into the hollow interior 42 of the dispensing means 18 so as to reside within the pocket member 30, with the door 32 being selectively closed to secure the business cards within the dispensing means 18. An individual desiring to remove one or more of the business cards from the pocket member 30 can thus simply open the door 32 and subsequently grasp and remove a single business card from the pocket member 30 as desired.

In use, the business card dispensing holder 10 according to the present invention can be easily secured to an exterior surface of a vehicle 16 as shown in FIGS. 1 and 2 of the drawings. Thus, an individual desiring information about an associated business can read such information from the ad 26 printed on the base plate 12, and obtain a business card relating to the associating business from the dispensing means 18 as described above.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A business card dispensing holder comprising:

a base plate being substantially rectangular in shape, the base plate having a central upper surface including indicia marked thereon;

a mounting means for securing the base plate relative to a vehicle, the mounting means comprising a depending lip formed along an upper edge of the base plate, the depending lip being shaped so as to project in a substantially spaced and parallel orientation relative to a rear surface of the base plate such that a window of a vehicle can be positioned between the depending lip and the base plate, a protective backing material coextensively positioned along the rear surface of the base plate and extending along an interior surface of the depending lip; and a dispensing means secured to a front of the base plate for supporting and permitting selective manual dispensing of business cards therefrom, the dispensing means being mounted proximal to a lower edge of the base plate such that the indicia is readily viewable along the central upper portion of the base plate the dispensing means comprising a substantially rectangular perimeter frame secured to a front face of the base plate; a pocket member mounted to the base plate and positioned within the perimeter frame; a door pivotally mounted to a vertical lateral edge of the perimeter frame; a vertical sealing strip extending along a vertical portion of the perimeter frame proximal to a pivotal mounting of the door to the perimeter frame; upper and lower horizontal sealing strips extending along upper and lower horizontal portions of the perimeter frame; cooperative sections of hook and loop material interposed between a lateral edge of the door and a lateral portion of the perimeter frame; and a knob secured to the door and projecting exteriorly thereof to facilitate manual pivoting of the door relative to the perimeter frame.

2. The business card dispensing holder of claim 1, and further comprising a plurality of business cards positioned within the pocket member.

3. A business card dispensing holder comprising:

a vehicle having an exterior surface and a window;

a base plate being substantially rectangular in shape, the base plate having a central upper surface including indicia marked thereon;

a mounting means for securing the base plate relative to a vehicle, the mounting means comprising a depending lip formed along an upper edge of the base plate, the depending lip being shaped so as to project in a substantially spaced and parallel orientation relative to a rear surface of the base plate, with the window of the vehicle being positioned between the depending lip and the base plate, a protective backing material coextensively positioned along the rear surface of the base plate and extending along an interior surface of the depending lip; and a dispensing means secured to a front of the base plate for supporting and permitting selective manual dispensing of business cards therefrom, the dispensing means being mounted proximal to a lower edge of the base plate such that the indicia is readily viewable along the central upper portion of the base plate, the dispensing means comprising a substantially rectangular perimeter frame secured to a front face of the base plate; a pocket member mounted to the base plate and positioned within the perimeter frame; a door pivotally mounted to a vertical lateral edge of the perimeter frame; a vertical sealing strip extending along a vertical portion of the perimeter frame proximal to a pivotal mounting of the door to the perimeter frame; upper and lower horizontal sealing strips extending along upper and lower horizontal portions of the perimeter frame; cooperative sections of hook and loop material interposed between a lateral edge of the door and a lateral portion of the perimeter frame; and a knob secured to the door and projecting exteriorly thereof to facilitate manual pivoting of the door relative to the perimeter frame.

4. The business card dispensing holder of claim 3, and further comprising a plurality of business cards positioned within the pocket member.

* * * * *